UNITED STATES PATENT OFFICE.

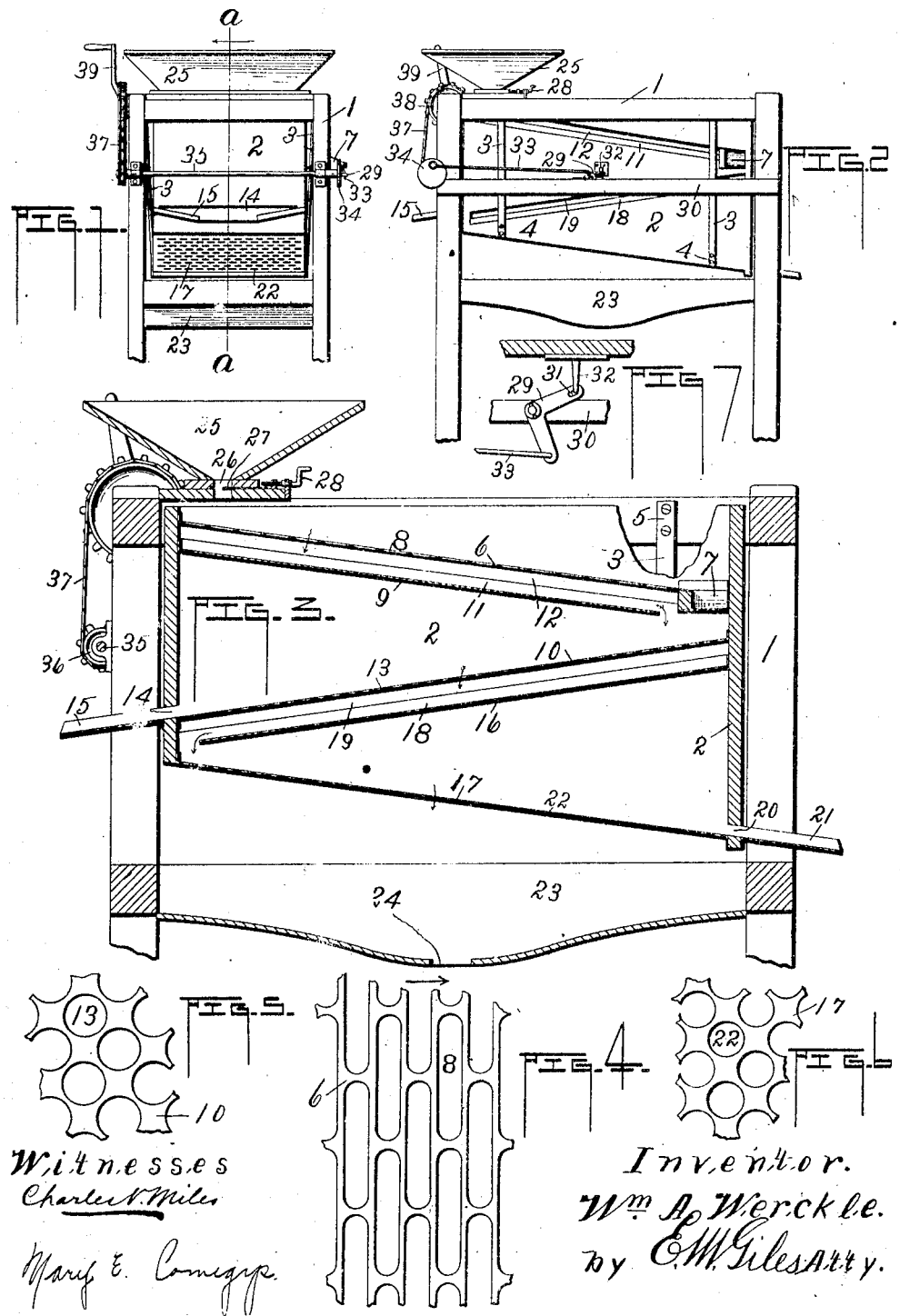

WILLIAM A. WERCKLE, OF PEORIA, ILLINOIS.

CORN-GRADER.

No. 887,557.

Specification of Letters Patent.

Patented May 12, 1908.

Application filed March 2, 1906. Serial No. 303,761.

*To all whom it may concern:*

Be it known that I, WILLIAM A. WERCKLE, a citizen of the United States, residing at Peoria, in the county of Peoria and State of Illinois, have invented certain new and useful Improvements in Corn-Graders; and I do hereby declare that the following is a full, clear, and exact description of the invention, which will enable others skilled in the art to which it appertains to make and use the same.

This invention has reference more particularly to machines for separating corn into grades according to its shape and size by screening it through a number of riddles.

The object of my invention is to provide a simple and inexpensive means whereby corn can be rapidly separated so as to give a grade of corn of uniform size and shape suitable for planter use.

Modern corn planters are so constructed that for satisfactory operation they require flat grains of uniform size, such as are found on the middle portion of the cob and it has also been demonstrated that sorted corn of this character makes a better yield.

My invention provides for sorting or separating corn so that a grade of the above nature can be obtained.

In the accompanying drawings, which are made a part hereof and in which similar reference characters indicate similar parts in the several views, Figure 1 is an end view of a machine for grading corn, constructed in accordance with my invention; Fig. 2 a side view of the corn grader of Fig. 1; Fig. 3 a vertical longitudinal sectional view, somewhat enlarged, on the line *a—a* of Fig. 1; Fig. 4 a view of a portion of what is herein termed the first riddle; Fig. 5 a view of a portion of what is herein termed the second riddle; Fig. 6 a view of what is herein termed the third riddle; and Fig. 7 a detail view showing the bell crank for vibrating the riddle frame.

1 of the drawings is a rigidly constructed frame, which supports the riddle frame or shoe 2, and the devices for feeding and operating the said riddle frame. This riddle frame 2 is loosely contained within and supported by the frame 1 so as to be capable of lateral vibratory movement, by means of the metal straps 3 (one near the end of each side of the riddle frame) which are connected to the riddle frame near the bottom as at 4 and to the frame 1 as at 5.

The riddle frame 2, which is closed on all sides except as hereinafter mentioned, has the first riddle 6 inclined longitudinally thereof, as shown, and terminates in the side discharging gutter or spout 7. This riddle 6 has slotted or oblong perforations 8 extending lengthwise thereof preferably staggered as shown, the said slotted perforations being approximately of the size shown in Fig. 4 of the drawings, which is sufficient to prevent the passage of the large round and irregular grains such as are found on the butt of the cob.

Directly beneath the riddle 6 and parallel therewith is a conveyer surface or partition 9, which terminates at its lower end a short distance from the end wall of the riddle frame, as shown, so as to collect the deposit from the riddle 6 and convey the same to the upper end of the riddle 10, which is inclined in the opposite direction, as shown. The sides 11 of the conveyer surface or partition 9 extend upward a sufficient distance to prevent spilling of the corn and there is preferably provided in the side walls of the riddle frame, directly beneath the riddle 6 a slot or opening 12 extending the whole length of the said riddle for the purpose of loosening any grains of corn that may become lodged in the perforations of the riddle.

The second riddle 10, which, as has been indicated, inclines in the inverse direction of the first riddle 6, is provided with round perforations 13 and communicates at its lower end through the opening 14 in the end wall of the riddle frame with the end discharging spout 15 which is contracted as shown at its outlet end. The perforations of this second riddle are approximately of the size shown in Fig. 5 and are adapted to prevent passage of the large flat grains of corn therethrough but to permit passage of the medium flat grains and inferior grains of corn, such as are found on the tip of the cob, which are collected upon the conveyer surface or partition 16, which is positioned directly beneath and parallel with the riddle and terminates at its lower end a short distance from the end wall of the riddle frame so as to convey the deposit from the said riddle 10 of the upper end of the third or last riddle 17. This conveyer surface or partition 16 is also furnished with the side walls or guards 18 to prevent spilling of the corn and there are also provided in the side walls of the riddle frame and directly below the riddle 10 openings 19 extending throughout the entire length of the riddle, whereby access may be had to the under surface of said riddle to remove any grains of corn that may become lodged in the perforations of the said riddle.

The riddle 17 which forms the bottom of the riddle frame is inclined in the opposite direction of the riddle 10 and communicates through an opening 20 in the end wall of the riddle frame with the end discharging spout 21, which has the outlet end thereof contracted similarly to the spout 15. This riddle 17 is provided with circular perforations 22, somewhat smaller than the perforations 13 of the riddle 10, which are of sufficient size to prevent passage of the medium flat grains of corn but to allow passage therethrough of all small grains of corn and chaff.

For collecting the deposit of small corn and chaff which pass through the riddle 17, there is provided on the frame 1 directly beneath the riddle frame a receptacle 23, the bottom of which inclines to a central aperture 24.

Mounted on the frame 1 at the upper end of the first riddle 6 is a hopper 25 which deposits through a slotted opening 26 extending from side to side of the machine from points within the side walls of the riddle frame. This hopper is provided with a slide valve 27, which is operated by the threaded crank 28 for regulating the size of the discharge opening and closing the same.

For vibrating the riddle frame, there is provided a bell crank 29 mounted on a cross piece 30 on the side of the riddle frame so as to oscillate in a horizontal plane. One arm of this bell crank has a slotted opening 31 which receives the hook end of the projection 32 from the side of the riddle frame. The other arm of said crank is connected by means of the rod 33 to a pin on the disk 34, which said disk is mounted on the end of the shaft 35, which is journaled to the frame 1 and extends from side to side thereof. On the opposite end of said shaft 35 is a small sprocket 36 driven by means of the sprocket chain 37 from the sprocket 38, which is also mounted on the frame 1 and is provided with the crank 39 for operating the same.

In the operation of the machine, a supply of corn is deposited in the hopper 25 and the slide valve 27 being open, a suitable distance, a constant stream is delivered onto the first riddle 6. The crank 39 is constantly turned, which vibrates the complete riddle frame laterally, thus agitating the corn on the riddles and assisting the flat grains to tip up on edge and fall through the slots 8 of the first riddle. This lateral movement not only assists in the screening of the corn through the first riddle, but retards the passage of the corn down the inclined riddles so that it will be thoroughly screened. This first riddle, as has been said, permits passage therethrough of all the grains of corn except the large round and irregular shaped grains, which are found on the butt of the cob, which pass into the gutter or spout 7 and are discharged at the side of the machine. The corn which passes through the riddle 6 is caused to pass down the riddle 10, which said riddle retains all the large flat grains and delivers the same out through the end spout 15. The small grains which pass through the perforations of the riddle 10 are again screened by the third riddle 17, which retains the medium flat grains and discharges the same through the end spout 15 while the corn and chaff which pass through the riddle is collected by the receptacle 23 and deposited through the opening 24.

From the foregoing, it will be seen that my machine separates the corn into four distinct grades, of which the large flat grains which are delivered from the spout 15 and the medium flat from the spout 21 are suitable for planter use.

What I claim is:

A corn grader comprising a stationary frame, a movable frame composed of a box-like structure formed with closed ends and sides, an inclined riddle and an inclined partition spaced apart and having one of its ends outturned and secured directly to the inner face of one of the said frame ends, said partition having upturned sides which provide guide flanges throughout its length, a transverse gutter secured to the other frame end, the opposite end of said riddle seating on and supported by the outer side of said gutter, said partition terminating at points spaced from but in horizontal alinement with the bottom of said gutter, and being supported at its free end by its said guide flanges, a second inclined riddle and partition spaced apart having outturned ends secured directly to the inner face of the frame end carrying said gutter, said second riddle being secured to the first named frame end at points alining with the bottom of an outlet opening provided in said first named frame end, said second partition having upturned sides which provide guide flanges throughout its length, an outwardly projecting gutter secured to the outer face of said first named frame end to aline with said outlet opening, a third inclined riddle secured to the lower end of the first named frame end, said riddle having an outurned end secured to the inner face of the other frame end at points alining with the bottom of an outlet opening provided in said last named frame end, and an outwardly projecting gutter secured to the outer face of the last named frame end in alinement with the bottom of said last named outlet opening, the sides of said frame being formed with inclined elongated slots which aline with the space between each riddle and partition and are of the same length as said space and of a width to enable access to said space.

In testimony whereof I have affixed my signature, in presence of two witnesses.

WM. A. WERCKLE.

Witnesses:
 E. M. GILES,
 MARY E. COMEGYS.